United States Patent Office — 3,417,120, Patented Dec. 17, 1968

3,417,120
PREPARATION OF ORGANOSILICON COMPOUNDS BY REACTION OF HYDROGENO-ORGANOSILICON COMPOUNDS WITH HYDROXYL - GROUP - CONTAINING ORGANIC COMPOUNDS
Jean Boissieras and Marcel Joseph Lefort, Lyon, France, assignors to Rhone-Poulenc S.A., Paris, France, a corporation of France
No Drawing. Filed July 9, 1965, Ser. No. 470,928
Claims priority, application France, July 16, 1964, 981,903, Patent 1,411,228; May 18, 1965, 17,464
6 Claims. (Cl. 260—448.2)

ABSTRACT OF THE DISCLOSURE

Hydroxylamine and N-substituted hydroxylamines are useful catalysts in the reaction of hydrogeno-organosilicon compounds with hydroxy-group-containing organic compounds.

---

The present invention relates to the preparation of organosilicon compounds from hydrogeno-organosilicon compounds (i.e. organosilicon compounds containing an Si-H linkage).

It is known to condense hydrogeno-organosilicon compounds with organic compounds containing an alcohol, phenol or carboxylic acid function. The reaction is accompanied by evolution of hydrogen and the formation of a silicon-oxygen bond as follows:

It is also known that, in the absence of any catalyst, this reaction takes place only very slowly (Miller et al., J. Amer. Chem. Soc. 79, 5604 (1957)) or not at all (Dolgov et al. Zhur. Obshchei Khim. 24, 1178 (1954) Chem. Abs. 49, 12,275 (1955)).

On the other hand, the reaction is readily carried out in the presence of strongly basic catalysts, such as oxides, hydroxides, alkali-metal alcoholates, or Lewis acids, such as zinc chloride, boron trifluoride or trichloride, aluminium trichloride or triiodide, or tin tetrachloride.

However, the use of these catalysts limits the application of the reaction because, when attempts are made to prepare organosilicon compounds containing functional groupings capable of reacting with one another, for example alkoxy and acyloxy groups, only poor yields of the desired products are obtained. Likewise, when a cyclic hydrogeno-organosilicon compound is used as starting material, the known processes are unsatisfactory, because the aforesaid catalysts tend to open the ring and thus to give, in addition to the desired product, more or less complex mixtures of siloxane polymers.

It has now been found that the reaction between hydrogeno-organosilicon compounds and organic compounds containing one or more hydroxyl groups is catalysed by hydroxylamine and N-substituted hydroxylamines, and that, using such catalysts, it is possible to employ as starting materials, without danger of side reactions, compounds having functional groups which, with the catalysts previously employed, would interfere in the reaction or give rise to undesirable side reactions, and cyclopolysiloxane compounds sensitive to the action of prior used catalysts.

The present invention accordingly provides a process for the preparation of an organosilicon compound, which comprises reacting a hydrogeno-organosilicon compound with an organic compound containing one or more hydroxyl groups in the presence of, as catalyst, hydroxylamine or an N-substituted hydroxylamine.

The hydrogeno-organosilicon compounds which may be employed in the new process are extremely varied. They may comprise one or more silicon-hydrogen bonds and may be monosilanes, polysilanes, polysilylalkanes, polysiloxanes or organocyclopolysiloxanes. The hydrocarbon groups attached to the silicon atoms of these various organosilicon compounds may vary widely, but are generally alkyl radicals of up to four carbon atoms, alkenyl radicals having only one double bond and of 2 to 4 carbon atoms, more particularly vinyl or allyl, saturated or monoethylenically unsaturated cycloaliphatic radicals of 5 to 6 carbon atoms, such as cyclopentyl, cyclohexyl or cyclohexenyl, aryl radicals, more particularly phenyl or phenyl substituted by one or more alkyl radicals of up to 4 carbon atoms, such as tolyl, xylyl or cumenyl, or aralkyl radicals, more particularly phenylalkyl radicals of 7 to 10 carbon atoms such as benzyl and phenylethyl. These hydrocarbon groups may also be substituted by halogen atoms or functional groups, and the silicon atoms may themselves be partially substituted by functional groups such as alkoxy and aryloxy groups.

By way of example, the following compounds may be mentioned.

(1) Hydrogeno-organosilanes of the general formula:

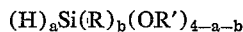

in which R and R' represent optionally substituted hydrocarbon groups, such as those previously defined, $a$ is 1, 2 or 3, and $b$ is equal to 0, 1, 2 or 3, the sum of $a$ and $b$ being at most equal to 4. Among these compounds the alkyl - hydrogenosilanes, alkoxy - hydrogenosilanes and alkylalkoxy-hydrogenosilanes may be particularly mentioned.

(2) Disilanes such as, for example, the compounds of the formula:

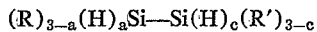

in which R and R' are as previously defined and $a$ and $c$ are each equal to 1, 2 or 3.

(3) Polysilylalkanes such as those of the formula:

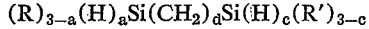

in which R and R', $a$ and $c$ are as previously defined, and $d$ is an integer.

(4) Linear polysiloxanes: either (a) of low molecular weight, such as the compounds of the formula:

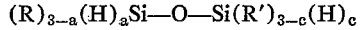

in which R and R', $a$ and $c$ are as previously defined: or
(b) of medium or high molecular weight, such as, more particularly, the compounds of the formula:

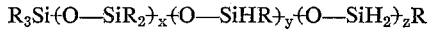

in which the various R symbols are identical or different, and each represents a hydrocarbon radical such as those previously mentioned, and $x$, $y$ and $z$ are integers, $y$ and $z$ optionally also being zero, and the various siloxane links may be randomly distributed in the linear chain; and the compounds of the general formula:

in which the symbols R, R' and R", which are the same or different, represent optionally substituted monovalent hydrocarbon radicals, such as those previously mentioned, and $n$ represents an integer.

(5) Cyclic polyorganopolysiloxanes such as, for example, 1,3,5-trimethyltrihydrogenocyclotrisiloxane, 1,3,5,7-tetramethyltetrahydrogenocyclotetrasiloxane, 1,3,5,7,9-pentamethylpentahydrogenocyclopentasiloxane, or 1,3,5-triphenyltrihydrogenocyclotrisiloxane.

The more important of these compounds may be represented by the formulae:

$$(H)_aSi(R)_b(OR)_{4-a-b}$$
$$(H)_a(R)_{3-a}Si(CH_2)_dSi(R)_{3-c}(H)_c$$
$$(H)_a(R)_{3-a}Si\!-\!O\!-\!(Si(R_2)O)_xSi(R)_{3-c}(H)_c \text{ or}$$
$$\text{(SiRH-O)}_y$$

in which R is alkyl of up to 4 carbon atoms, the various R radicals being the same or different, $a$ is 1, 2, or 3, $b$ is 1, 2, or 3, the sum of $a$ and $b$ being 2, 3, or 4, $c$ is 1, 2, or 3, $d$ is an integer up to 12, $x$ is 0 or an integer, and $y$ is an integer from 3 to 8. Especially valuable products can be obtained (as described in more detail below) when the process of the invention is applied to starting materials of the formula:

$$R\!-\!SiH_2\!-\!O\!-\!(SiR_2\!-\!O)_xSiH_2\!-\!R$$

in which R is alkyl of up to 4 carbon atoms, the various R radicals being the same or different, and $x$ is an integer greater than 50.

The organic compounds containing one or more hydroxy groups which may be employed in the new process include not only compounds containing free hydroxyl groups but also compounds containing enolizable carbonyl groups, e.g. those described in French Patent No. 1,391,833. If desired, the hydroxyl-group-containing organic compounds may contain other functional groupings, provided that, under the reaction conditions, these other groupings give rise to no, or substantially no, side reactions. As examples of such compounds, alcohols, phenols, carboxylic acids and oximes may be mentioned, e.g. aliphatic or alicyclic monoalcohols such as ethanol, butanol, octanol or cyclohexanol; polyols such as ethylene glycol or hexanediol; phenol; organic carboxylic acids such as lower alkanoic acids and benzoic acid; keto alcohols; alcohol esters; aldoximes and ketoximes, such as the oximes of ethanal, propanal, butanal, acetone and diethylketone; acid esters; alcohol ethers such as polyalkylene glycols, for example polyethylene glycols and polypropylene glycols.

The preferred hydroxyl-group-containing compounds are alkanols of up to 4 carbon atoms, phenol, alkanoic acids of up to 4 carbon atoms, benzoic acid, and oximes of saturated aliphatic aldehydes and ketones of up to 4 carbon atoms.

As in the previously known processes, the reaction between the hydrogeno-organosilicon compound and the hydroxyl-group-containing organic compound takes place with evolution of hydrogen.

The catalyst used may be represented by the general formula:

$$R^1R^2NOH$$

in which $R^1$ and $R^2$, which are identical or different, represent hydrogen or monovalent hydrocarbon radicals, $R^1$ and $R^2$ being optionally linked together. Preferably $R^1$ and $R^2$ are hydrogen or alkyl of, e.g. up to 4 carbon atoms, such as methyl, ethyl or propyl.

To carry out the reaction, the reactants and the catalyst are mixed and brought to the appropriate temperature. If one of the reactants is volatile, it is necessary to cool and preferably to add one of the reactants gradually to the other reactant containing the catalyst.

According to the reactivity of the starting materials and their volatility, it is possible to operate without any external source of heat with the reactants at ambient temperature (20° C.) or with cooling, at least at the beginning of the process, or with heating, at least at the end of the reaction. The optimum operating conditions for each particular case may readily be found by routine experiment. Generally speaking the optimum temperature is from —10° C. to +100° C.

The proportion of catalyst employed for carrying out the reaction is generally between 0.1% and 10% of the weight of hydrogeno-organosilicon compound employed, but the preferred percentage is between 1% and 5%.

The reaction may be carried out with or without an inert diluent, the latter being added if it is desired or necessary to modify the boiling point or the homogeneity of the medium. Suitable solvents are ethers or aliphatic or aromatic halogenated or non-halogenated hydrocarbons.

It is generally advantageous to employ quantities of reactants in the neighbourhood of the stoichiometric proportions, so that it is unnecessary to separate any excess of reactant employed at the end of the operation.

Since the reaction is accompanied only by evolution of hydrogen, the only product to be separated from the reaction medium is the hydroxylamine catalyst employed. Since the presence of a small quantity of this latter substance is generally of little disadvantage for the uses to which the silicon compound obtained is intended, it follows that the product can often be used without further treatment.

In any case, if desired, the hydroxylamine catalyst may be eliminated without difficulty, for example by distillation or extraction with an appropriate solvent. The process of the invention makes it possible to prepare organosilicon compounds of very varied and well-defined structures containing a variety of functional groupings. More particularly, it is possible to prepare diorganopolysiloxane compounds of well-defined structure comprising hydrolysable functional groupings, which can be converted into elastic solids at ambient temperature (20° C.) simply by the action of water or water vapour, optionally in the presence of a catalyst. More particularly, the new process may be used to prepare compounds of the formula:

$$R\!-\!Si(OZ)_2\!-\!O(SiR_2\!-\!O)_xSi(OZ)_2\!-\!R$$

from the above-mentioned compounds of formula:

$$R\!-\!SiH_2\!-\!O(SiR_2\!-\!O)_xSiH_2\!-\!R$$

where R and $x$ are as hereinbefore defined and —OZ is a hydrolysable grouping, by reacting the latter in accordance with the invention with a compound of formula: Z—OH. Since the process of the invention gives substantially no side reactions, the compounds obtained have the same basic polysiloxane chain as that of the starting materials.

The starting materials of formula:

$$R\!-\!SiH_2\!-\!O(SiR_2)_xSiH_2\!-\!R$$

may be prepared by the action of an organosilane of the general formula: R—SiH$_2$—X in which X represents a hydrolysable atom or group such that the compound HX has an acid or basic reaction, with an $\alpha,\omega$,dihydroxy-diorganopolysiloxane of the general formula:

$$HO(SiR_2\!-\!O)_xH$$

optionally in the presence of a diluent and of a neutralising agent for the compound HX formed. X may be, more particularly, chlorine or an acyloxy group, in which case HX is a compound having an acid reaction, or an amino group, in which case HX is a compound having a basic reaction. Suitable acyloxy groups include lower alkanoyloxy groups such as acetoxy or propionyloxy.

Preferred compounds of formula: R—SiH$_2$—X are monomethylmonochlorosilane, monoethylmonochlorosilane, monomethylmonoacetoxysilane, and monophenylmonoacetoxysilane, which, like the other compounds of this formula, are known.

The compounds of formula: HO(SiR$_2$—O)$_x$H are also known and may be prepared, for example, as described in United States patent specification No. 2,843,555. It will be understood that in these compounds the various R radicals are not necessarily the same throughout any particular molecule and that the compounds generally used will be mixtures of compounds having different values of $x$, the average value of $x$ being greater than 50.

The reaction between the compound of formula R—SiH₂—X and the compound of formula HO(SiR₂—O)ₓH takes place spontaneously on mixing the reactants. Theoretically, two molecules of the first compound are required for each molecule of the second, but in practice it may be more advantageous to operate with an excess of the first compound. The reaction may be carried out with or without a diluent at ambient temperature (20° C.), or at higher temperatures, or it may be carried out at lower temperatures if the compound of formula R—SiH₂—X is volatile at ambient temperature. Preferably, when the compound HX is an acid, the reaction is carried out in the presence of a base, more especially a tertiary amine employed in amount equivalent to the quantity of acid liberated in the reaction. The product of the reaction may be isolated by application of known methods.

The following examples illustrate the invention. The volumes of hydrogen indicated in these examples are volumes expressed under normal temperature and pressure conditions.

Example 1

Into a 100 cc. round-bottomed flask provided with a dry nitrogen inlet, a reflux condenser, a dropping funnel, a mechanical stirrer and a thermometer tube are introduced 33.5 g. of methyldiethoxysilane. The apparatus is then purged with dry nitrogen and connected by means of a drying tube to a water tank for measuring the hydrogen evolved. 1 g. of diethylhydroxylamine is introduced and then gradually and with stirring, 14 g. of glacial acetic acid, the reaction mixture being cooled so as to maintain it at about 10° C. The operation lasts approximately 30 minutes. The mixture is then allowed to heat up to ambient temperature and, when the evolution of hydrogen has ceased, it is subjected to fractional distillation. 30 g. of methyldiethoxyacetoxysilane are thus isolated, distilling at 69°–70.5° C./20 mm. Hg, in the form of a colourless liquid having $n_D^{20}=1.3931$ and $d_4^{20}=0.983$. The yield based on acetic acid employed is 68%.

Example 2

Into a 100 cc. round-bottomed flask equipped as described in Exampe 1 are introduced 33.5 g. of methyldiethoxysilane, 27 g. of benzoic acid and 1 g. of dimethylhydroxylamine. The evolution of hydrogen begins immediately and continues regularly for 2 hours, the temperature of the reaction mixture having been maintained at 20–22° C. A homogeneous liquid is obtained which gives on distillation 43 g. of methyldiethoxybenzoyloxysilane, B.P. 94–94.5° C./0.6 mm. Hg, and having $n_D^{20}=1.4681$ and $d_4^{20}=1.059$. The yield based on the benzoic acid employed is 76%.

Example 3

By proceeding as in Example 2, starting with 33.5 g. of methyldiethoxysilane, 40.5 g. of acetylsalicyclic acid and 1 g. of methylethylhydroxylamine, 56 g. of methyldiethoxy (acetylsalicyloxy)silane are obtained B.P. 127–128° C./0.6 mm. Hg, $n_D^{20}=1.4728$, and $d_4^{20}=1.120$. The yield based on the acetylsalicylic acid employed is 78%.

Example 4

Into a 500 cc. round-bottomed flask equipped as described in Example 1 are introduced 21.2 g. of 1,3-dimethyldisiloxane and 1 g. of diethylhydroxylamine, and the flask is then cooled to 10° C., the apparatus being simultaneously purged with dry nitrogen. 59 g. of acetaldoxime are then gradually added with stirring, the reaction temperature being maintained at about 10° C. The evolution of hydrogen continues regularly in the course of this operation, which lasts about 2 hours. The volatile products are then distilled off by heating, first at 60° C. under 15 mm. Hg, and finally at 90° C. under 0.5 mm. Hg. 62.2 g. of 1,3-dimethyl-1,1,3,3-tetrakis(ethanimi-noxy)disiloxane are thus obtained, having $n_D^{20}=1.4560$ and $d_4^{20}=1.097$. The yield based on the silane employed is 93%.

Example 5

Into a round-bottomed flask equipped as in Example 1, are introduced 60 g. of 1,3,5,7-tetramethylcyclotetrasiloxane and then, under the conditions described in Example 1, 48 g. of anhydrous methanol containing 0.5 g. of hydroxylamine, in 40 minutes, while the temperature is maintained at about 0° C. The mixture is allowed to return to ambient temperature and, when the evolution of hydrogen has ceased, it is heated in vacuo to 90° C. to eliminate the volatile products. 89 g. of 1,3,5,7-tetramethoxy - 1,3,5,7 - tetramethylcyclotetrasiloxane are thus isolated.

Example 6

Into a 100 cc. round-bottomed flask provided with a dry nitrogen inlet, a reflux condenser, a dropping funnel, a mechanical stirrer and a thermometer tube are introduced 14 g. of 1,3-dimethyltetrahydrogenodisiloxane. The apparatus is then purged with dry nitrogen and connected through a drying tube to a water tank for measuring the volume of hyddrogen evolved. 0.5 g. of diethylhydroxylamine are introduced and then, gradually and with stirring, 45 g. of 4-hydroxy-2-butanone, the reaction mixture being cooled so as to maintain it at about −10° C. The operation lasts approximately 2 hours, 30 minutes. The volume of hydrogen evolved during this time is 9 litres.

The mixture is then allowed to heat up to ambient temperature and the evolution of hydrogen continues for a few more hours. When the evolution has ceased, volatile materials are removed by heating at 80° C. under 0.5 mm. Hg for one hour. 30 g. of 1,3-dimethyl-1,1,3,3-tetrakis(3-oxobutyloxy)disiloxane remain, having $n_D^{20}=1.4452$ and $d_4^{20}=1.118$.

Example 7

The procedure of Example 6 is followed, using 25 g. of 3-hydrdoxy-2-butanone, 0.2 g. of dimethylhydroxylamine, and 6 g. of 1,3-dimethyltetrahydrogenodisiloxane. The 3-hydroxy-2-butanone is introduced during one and a half hours into the mixture, which is maintained at 0° C.

After removal of volatile materials 19.5 g. of 1,3-dimethyl - 1,1,3,3 - tetrakis(1 - methyl-2-oxopropyloxy)-disiloxane remain, having $n_D^{20}=1.4348$ and $d_4^{20}=1.089$.

Example 8

By following the procedure of Example 7 with 60 g. of ethyl lactate, 0.2 cc. of diethylhydroxylamine and 12 g. of 1,3-dimethyltetrahydrogenodisiloxane, 66 g. of 1,3-dimethyl - 1,1,3,3 - tetrakis(1-ethoxycarbonyl-1-ethoxy)-disiloxane are obtained having $n_D^{20}=1.4287$ and $$d_4^{20}=1.110$$

Example 9

Into a 100 cc. round-bottomed flask equipped as described in Example 6 are introduced 12 g. of 1,2 - bis(methyldihydrogenosilyl)ethane and 1.5 g. of diethylhydroxylamine. The mixture is cooled to 3° C. and 50 g. of 3-hydroxy-2butanone are gradually introduced in one and a half hours with stirring, the mixture being maintained at a temperature of about 3° C. The mixture is then heated at 70° C. for 2 hours. By distillation, 29 g. of 1,2-[methyl - bis(1 - methyl-2-oxo-propyloxy)silyl]-ethane are isolated, B.P. 179°–181° C./0.2 mm. Hg, $n_D^{20}=1.4500$, and $d_4^{20}=1.052$.

Example 10

Into a 250 cc. round-bottomed flask equipped as described in Example 6 are introduced 67 g. of methyldiethoxysilane and 2 cc. of diethylhydroxylamine, and then, during forty minutes with stirring, a solution of 55 cc. of cyclohexanol in 50 cc. of heptane. The mixture is left for 18 hours at ambient temperature after which evolution of hydrogen has ceased, and is then heated under reflux for 30 minutes. On distillation, 46.4 g. of methyldiethoxy-cyclohexyl-oxysilane are isolated, B.P. 61–62° C./0.6 mm. Hg, $n_D^{20}=1.4235$, and $d_4^{20}=0.943$.

Example 11

The operation is carried out in an apparatus identical with that described in Example 6. 90 g. of ethyl acetoacetate and 3.9 g. of diethylhydroxylamine are introduced into the round-bottomed flask followed by, gradually and with stirring, 27 g. of methyldiethoxysilane. In the course of the operation, which lasts 1 hour, the reaction temperature gradually rises from 24° C. to 42° C., and 2,300 cc. of hydrogen are collected. The contents of the flask are heated to 90–100° C. for several hours, and then distilled under reduced pressure. 37 g. of [(1 - methyl-2-ethoxycarbonyl)vinyloxy]methyldiethoxysilane are isolated, B.P. 129–130° C./14 mm. Hg, $n_D^{20}=1.4339$, and $d_4^{20}=1.0187$.

Example 12

Into a 250 cc. round-bottomed flask equipped as described in Example 6 are introduced 19.8 g. of phenol, 13.8 g. of 1,1,3,3-tetramethyldisiloxane, 50 cc. of anhydrous benzene, and 1 cc. of dimethylhydroxylamine. The mixture is heated with stirring at 65° C. for 2½ hours, and the contents of the flask are then allowed to stand overnight at ambient temperature (20° C.). The mixture is again heated for 4 hours at 65° C., after which time the theoretical quantity of hydrogen has been collected. The benzene is eliminated under a moderate vacuum and the residue is then distilled under a pressure of 0.15 mm. Hg. 16 g. of a clear liquid, B.P. 117–120° C./0.15 mm. Hg, $n_D^{20}=1.500$, $d_4^{20}=1.0425$, are thus obtained, identified as 1,1,3,3-tetramethyl-1,3-diphenoxydisiloxane.

Example 13

An apparatus consisting of a 250 cc. round-bottomed flask provided with a dry nitrogen inlet, a reflux condenser, a dropping funnel, a mechanical stirrer and a thermometer tube, is very carefully dried, and 100 g. of a tetrahydrogenated dimethylpolysiloxane oil of the average formula:

$$CH_3—SiH_2—O(Si(CH_3)_2—O)_{162}SiH_2—CH_3$$

having a viscosity of 544 centistokes at 20° C., 8 g. of benzoic acid, and 100 cc. of anhydrous diethyl ether are introduced into the flask. The apparatus is then purged with dry nitrogen and connected through a drying tube to a water tank for measuring the volume of hydrogen evolved. The mixture is stirred and heated to reflux, and 1 g. of diethylhydroxylamine is introduced. The heating is continued for 2 hours and 740 cc. of hydrogen are collected.

The ether is eliminated by distillation at atmospheric pressure in a current of dry nitrogen, the contents of the flask being heated to 100° C., and the excess of benzoic acid contained in the residual product is filtered off, the operation still being carried out in an anhydrous atmosphere. 103 g. of a clear oil are obtained, consisting of dimethylpolysiloxane having a viscosity very close to that of the starting dimethylpolysiloxane and having two benzoyloxy groupings on each of the terminal silicon atoms.

A part of this oil is spread in a layer 1.5 mm. thick on a glass plate previously coated with an aqueous solution of the sodium salt of a secondary alcohol sulphate, marketed under the trade mark "Teepol." After two minutes, the film is hardened on the surface, and after 45 minutes it can be detached from its support, it then being completely hard. In the course of the hardening, the benzoic acid liberated by hydrolysis of the benzoyloxy groups renders the film opaque.

Example 14

In a well-dried 1000 cc. round-bottom flask provided with the equipment described in Example 13, a mixture of 200 g. of tetrahydrogenated dimethylpolysiloxane oil of the average formula:

$$CH_3—SiH_2—O(Si(CH_3)_2—O)_{140}SiH_2—CH_3$$

having a viscosity of 530 centistokes at 20° C., 200 cc. of anhydrous benzene and 2 g. of diethylhydroxylamine are stirred for several minutes. 20 g. of absolute ethanol are then introduced in 20 minutes with stirring and the mixture is stirred for 2 hours at ambient temperature (20° C.), and then for 3 hours at 65–70° C. The volume of hydrogen evolved is 1700 cc. The benzene is eliminated under 20 mm. Hg, and volatile materials are removed by heating at 60° under 0.2 mm. Hg for one hour. 203 g. of α,ω-bis(methyldiethoxysilyl)-polydimethylsiloxane oil remain, of the average formula:

$$CH_3—Si(OC_2H_5)_2—O(Si(CH_3)_2—O)_{140}Si(OC_2H_5)_2—CH_3$$

The tetrahydrogenated dimethylpolysiloxane oil starting material may itself be prepared as follows. A solution of 1000 g. of an α,ω-dihydroxydimethylpolysiloxane oil, having a viscosity of 505 centistokes at 25° C. (OH% =0.35) and containing no volatile materials, and 22.5 g. of triethylamine in 1 litre of diethyl ether is reacted at 0° C. with 25 g. of monomethylmonochlorosilane. In this experiment the methylchlorosilane, which is cooled below 0° C., is added in 5 minutes without previous dilution. The contents of the flask are allowed to heat up to ambient temperature and the liquid obtained is then brought to the reflux temperature of the ether for 3 hours. Finally, the product is filtered to separate the amine hydrochloride and the ether is then distilled off. A clear liquid having a viscosity of 450 centistokes at 25° C. is thus obtained, of which the percentage of hydrogen bound to silicon is 0.04%, which corresponds to average formula already given.

The α,ω,dihydroxydimethylpolysiloxane oil used as starting material, is itself prepared by heating 5000 g. of octamethylcyclotetrasiloxane for half an hour at 160° C. with 50 mg. of potassium hydroxide, which gives a highly viscous oil, into which water vapour is introduced, the temperature being maintained for four hours. After neutralisation, the volatile products are driven off from the oil obtained, and the mass is cooled in a continuous current of nitrogen.

Example 15

The operation is carried out in an apparatus identical with that described in Example 14. 370 g. of a tetrahydrogenated dimethylpolysiloxane oil of the average formula:

$$CH_3—SiH_2—O(Si(CH_3)_2—O)_{339}SiH_2—CH_3$$

are mixed in the round-bottomed flask with 2.5 g. of diethylhydroxylamine and 40 g. of methylethylketone oxime, and the mixture is then stirred for one hour at ambient temperature (20° C.). The stirring is continued for 1½ hours at 45° C. and for 8 hours at 80–90° C. The volume of hydrogen evolved is then 1310 cc.

Volatile materials are removed from the contents of the flask by heating at 100° C. under 2 mm. Hg for 1 hour, and 374 g. of α,ω-bis[methyl-bis(1-methylpropaniminoxy)silyl]polydimethylsiloxane finally remain of the average formula:

$$CH_3—Si(ON{:}C(CH_3)C_2H_5)_2—O(Si(CH_3)_2—O)_{339}Si(ON{:}C(CH_3)C_2H_5)_2—CH_3$$

The dimethylpolysiloxane oil starting material is prepared in the same way as in Example 14, but the 505 centistokes dimethylpolysiloxane oil is replaced by 500 g. of a dimethylpolysiloxane oil having a viscosity of about 5000 centistokes at 25° C., free from volatile constituents, and in which the percentage of hydroxyl attached to silicon is 0.15. In this experiment, the monomethylmonochlorosilane (10 g.) was diluted with 20 cc. of diethyl ether, and this solution, cooled to 0° C., was added in 5 minutes. The final oil obtained after all the purifying treatments has a viscosity of about 5200 centistokes at 25° C., and a percentage of hydrogen bound to silicon equal to 0.016%, which corresponds on average to the formula already given.

Example 16

By proceeding as in Example 15, starting with 260 g. of a tetrahydrogenated dimethylpolysiloxane oil of the average formula:

$$CH_3-SiH_2-O(Si(CH_3)_2-O)_{140}SiH_2-CH_3$$

1.5 g. of methylethylhydroxylamine and 29.5 g. of acetaldoxime, 265 g. of bis-[methyl-bis-(ethaniminoxy)silyl]-polydimethylsiloxane are obtained of the average formula:

$$CH_3-Si(ON:CH.CH_3)_2-O(Si(CH_3)_2-O)_{140}$$
$$Si(ON:CH.CH_3)_2-CH_3$$

We claim:
1. Process for the preparation of an organosilicon compound which comprises reacting a hydrogeno-organosilicon compound of the formula:

$$(H)_aSi(R)_b(OR)_{4-a-b}$$
$$(H)_a(R)_{3-a}Si(CH_2)_dSi(R)_{3-c}(H)_c$$
$$(H)_a(R)_{3-a}Si-O-(Si(R)_2O)_xSi(R)_{3-c}(H)_c$$

or $$(SiRH-O)_y$$

in which R is alkyl of up to 4 carbon atoms, the various R radicals being the same or different, a is 1, 2, or 3, b is 1, 2, or 3, the sum of a and b being 2, 3, or 4, c is 1, 2, or 3, d is an integer up to 12, x is 0 or an integer, and y is an integer from 3 to 8, with a hydroxyl-group-containing compound selected from the class consisting of alkanols of up to 4 carbon atoms, phenol, alkanoic acids of up to 4 carbon atoms, benzoic acid, and oximes of saturated aliphatic aldehydes and ketones of up to 4 carbon atoms, in the presence of, as catalyst, a hydroxylamine of formula: $R^1R^2NOH$, in which $R^1$ and $R^2$ are the same or different and each is hydrogen or alkyl of 1 to 4 carbon atoms.

2. Process according to claim 1, in which the hydrogeno-organosilicon compound has the formula:

$$R-SiH_2-O(SiR_2-O)_xSiH_2-R$$

in which R is alkyl of up to 4 carbon atoms, have various R radicals being the same or different, and x is an integer greater than 50.

3. Process according to claim 1, in which the reaction is carried out in a diluent inert under the operating conditions.

4. Process according to claim 1, in which the proportion of the said catalyst is from 0.1% to 10% by weight of the hydrogeno-organosilicon compound and the reaction mixture is maintained at a temperature from −10° to +100° C.

5. Process according to claim 1, in which the said catalyst is hydroxylamine or diethylhydroxylamine.

6. Process for the preparation of an organosilicon compound which comprises reacting a hydrogeno-organopolysiloxane of the formula:

$$R-SiH_2-O(SiR_2-O)_xSiH_2-R$$

in which R is alkyl of up to 4 carbon atoms, the R radicals being the same or different, and x is an integer greater than 50, with an alkanol of up to 4 carbon atoms, phenol, an alkanoic acid of up to 4 carbon atoms, benzoic acid, or an oxime of a saturated aliphatic aldehyde or ketone of up to 4 carbon atoms in an inert diluent at a temperature from −10° to +100° C. in the presence of, as catalyst, 0.1% to 10% by weight of the hydrogeno-organopolysiloxane of a hydroxylamine of formula:

$$R^1R^2NOH$$

in which $R^1$ and $R^2$ are the same or different and each is hydrogen or alkyl of 1 to 4 carbon atoms.

References Cited

UNITED STATES PATENTS 2,967,171   1/1961   Barnes et al. _____ 260—46.5 XR

OTHER REFERENCES

Eaborn, "Organosilicon Compounds," Academic Press, Inc. (1960) pp. 202 and 207.

HELEN M. McCARTHY, *Primary Examiner.*

J. P. PODGORSKI, *Assistant Examiner.*

U.S. Cl. X.R.

260—46.5, 448.8